United States Patent [19]
Kline

[11] 3,975,414
[45] Aug. 17, 1976

[54] N,N-BIS(4-ANILINOPHENYL)-4,7-DITHIA-5-METHYLDECANEDIAMIDE AND RELATED COMPOUNDS USEFUL AS POLYMER STABILIZERS

[75] Inventor: Richard H. Kline, Cuyahoga Falls, Ohio

[73] Assignee: The Goodyear Tire & Rubber Company, Akron, Ohio

[22] Filed: May 8, 1975

[21] Appl. No.: 575,861

[52] U.S. Cl.............. 260/42.47; 260/45.85 A; 260/45.9 NC; 260/470; 260/562 P; 260/562 S
[51] Int. Cl.² .......................................... C08J 3/20
[58] Field of Search ......... 260/562 S, 562 P, 470 R, 260/45.85 A, 45.9 NC, 42.47

[56] References Cited
UNITED STATES PATENTS

| | | | |
|---|---|---|---|
| 2,169,618 | 8/1939 | Sikley | 260/562 P |
| 3,377,315 | 4/1968 | Ashton et al. | 260/562 P |
| 3,558,552 | 1/1971 | Spacht | 260/45.9 NC |
| 3,590,083 | 6/1971 | Dexter et al. | 260/562 S |
| 3,658,769 | 4/1972 | Kline | 260/45.9 NC |
| 3,764,580 | 10/1973 | Beears | 260/45.85 A |
| 3,767,628 | 10/1973 | Kline | 260/45.9 NC |
| 3,839,274 | 10/1974 | Beears | 260/45.9 NC |
| 3,867,334 | 2/1975 | Maxey | 260/45.9 NC |

*Primary Examiner*—V. P. Hoke
*Attorney, Agent, or Firm*—F. W. Brunner; J. A. Rozmajzl

[57] ABSTRACT

N,N'-bis(4-anilinophenyl)-4,7-dithia-5-methyldecanediamide and related antioxidants are used to offer protection to unvulcanized and vulcanized polymers. They are particularly effective in stabilizing vulcanized NBR when it is exposed to high temperature aging.

8 Claims, No Drawings

N,N-BIS(4-ANILINOPHENYL)-4,7-DITHIA-5-METHYLDECANEDIAMIDE AND RELATED COMPOUNDS USEFUL AS POLYMER STABILIZERS

This invention relates to antioxidants for both unvulcanized and vulcanized polymers.

Although much work has been done towards the discovery and development of various antioxidants over the years, (e.g., see the amide antioxidants described in U.S. Pat. Nos. 3,658,769 and 3,377,315) work in this area continues in an effort to discover new and better antioxidants. There is particular activity in the area of antioxidants which will remain in the polymer even after extended exposure to high temperature. For example, polymers used to fabricate products such as hoses, gaskets, and seals for use in automobile engines require antioxidants which will persist at the operating temperature of the engine. It is important that the antioxidants possess low volatility and high antioxidant activity.

It is an object of the present invention to provide antioxidants which will protect both unvulcanized and vulcanized polymers. It is also an object of the present invention to provide antioxidants which possess low volatility and high antioxidant activity. Other objects will become apparent as the description proceeds.

The objects of the present invention are accomplished by the manufacture and use of amide antioxidants having the structural formula:

wherein A and A¹ have the following structural formula:

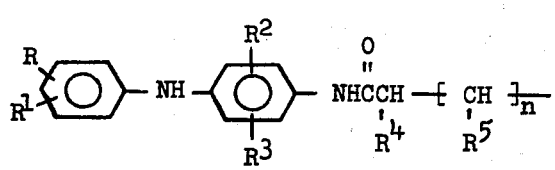

(I)

where R and R¹ are selected from the group consisting of hydrogen, alkyl radicals having 1 to 4 carbon atoms and alkoxy radicals having 1 to 4 carbon atoms; $R^2$ and $R^3$ are selected from the group consisting of hydrogen and alkyl radicals having 1 to 4 carbon atoms; $R^4$ is selected from the group consisting of hydrogen and alkyl radicals having from 1 to 4 carbon atoms; $R^5$ is selected from the group consisting of hydrogen and alkyl radicals having from 1 to 4 carbon atoms; wherein X has the structure

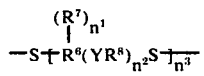

wherein $R^6$ is selected from the group consisting of alkylene radicals having from 1 to 6 carbon atoms, cycloalkylene radicals having from 5 to 12 carbon atoms, and radicals having the structural formula

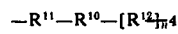

wherein $R^{10}$ is a cycloalkylene radical having from 5 to 12 carbon atoms, $R^{11}$ and $R^{12}$ are alkylene radicals having from 1 to 6 carbon atoms, and $n^4$ is 0 or 1 and wherein $R^7$ is an alkyl radical having from 1 to 4 carbon atoms, $R^8$ is an alkylene radical having from 1 to 6 carbon atoms, Y is selected from the group consisting of —O—, —S—, 1,4-phenylene and

wherein $R^9$ is an alkylene radical having from 2 to 6 carbon atoms which can be unsubstituted or substituted with one or two groups of the structure

wherein B conforms to structural formula

$n$, $n^2$ and $n^3$ are zero or 1 and $n^1$ is zero or 1 to 4.

Although the method of preparation is not critical to the practice of the present invention, the compounds of this invention can be prepared by the base catalyzed addition of a mercaptan of Formula II or a dimercaptan of Formula III to an unsaturated amide of Formula IV or by the addition of a mercaptan of Formula II to a polyunsaturated ester of Formula V or by the condensation of a mercaptan of Formula II with a dihalide of Formula VI. These reactions are normally carried out in an inert solvent at a temperature between room temperature and the boiling point of the solvent.

Formulae II to VI appear below.

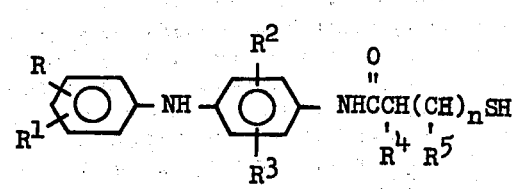

(II)

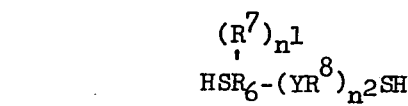
(III)

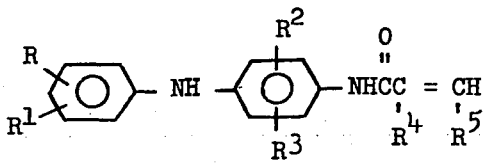
(IV)

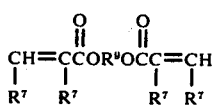
(V)

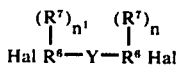
(VI)

wherein Hal represents chlorine or bromine.

The polymers to be stabilized within the practice of the present invention are vulcanized or unvulcanized, natural and synthetic polymers, both saturated and unsaturated. Vulcanization systems include systems containing sulfur and/or sulfur donors. Illustrative of such polymers are natural rubber; homopolymers of 1,3-butadiene, isoprene, and 2,3-dimethyl butadiene; rubbery copolymers of butadiene and styrene; rubbery copolymers of butadiene and acrylonitrile; polyethylene and polypropylene. The polymers to be protected by the antioxidants of the present invention can contain any of the conventional compounding ingredients, for example, carbon black, sulfur, etc.

The method by which the antioxidants are added to the polymers to be stabilized is not critical to the practice of the present invention. Any of the conventional methods of addition can be used. For example, an emulsion or suspension of an antioxidant can be added to a polymer latex or an antioxidant can be added directly to the solid polymer on a mill or in a Banbury.

The antioxidants are used in typical antioxidant amounts ranging from 0.25 to 10 parts by weight per 100 parts of polymer and preferably in the range of from 0.5 to 3.0 parts.

The following compounds are intended to illustrate but not to limit the compounds that may be used in the practice of the present invention.

N,N'-bis(4-anilinophenyl)-4,7-dithiadecanediamide
N,N'-bis(4-anilinophenyl)-4,7-dithia-5-methyldecanediamide
N,N'-bis(4-anilinophenyl)-4,9-dithiadodecanediamide
N,N'-bis(4-anilinophenyl)-4,10-dithia-7-oxatridecanediamide
N,N'-bis(4-anilinophenyl)-4,7,10-trithiatridecanediamide
N,N'-bis(4-anilinophenyl)-2,12-dimethyl-4,7,10-trithiatridecanediamide
N,N'-bis(4-anilinophenyl)-2,9-dimethyl-4,7-dithiadecanediamide
N,N'-bis(4-anilinophenyl)-2,11-dimethyl-4,9-dithiadodecanediamide
N,N'-bis(4-anilinophenyl)-4-thiaheptanediamide
N,N'-bis(4-anilinophenyl)-3-thiahexanediamide
1,6-hexamethylene bis [N-(4-anilinophenyl)-4-thiaheptanamate]
1,6-hexamethylene bis [N-(4-anilinophenyl)-4-thiahexanamate]
4,4'-(1,4-phenylene)bis[N-(4-anilinophenyl)-3-thiabutyramide]
N,N'-bis[4-(4-methylanilino)phenyl]-3,8-dimethyl-4,7-dithiadecanediamide
N,N'-bis[4-(2,4-dimethylanilino)phenyl]-4,13-dithiahexadecanediamide
N,N'-bis[4-(4-methoxyanilino)phenyl]-4,7-dithia-5,6-dimethyldecanediamide
Ethylene bis [N-(4-anilinophenyl)-4-thiaheptanamate]
N,N'-bis(4-anilino-2-methylphenyl)-4,8-dithiaundecanediamide
1,2,3-propanetriyl tris [N-(4-anilinophenyl)-4-thiaheptaneamate]

Preferred compounds are those in which $R^1$, $R^2$, $R^3$, $R^4$ and $R^5$ are hydrogen and $n^3$ is 0 or 1; when $n^3$ is 1 and $n^2$ is 0, $R^7$ is hydrogen or methyl and $R^6$ is (alkyl) cycloalkylene or ethylene; and when $n^3$ is 1 and $n^2$ is 1, $R^6$ and $R^8$ are ethylene and Y is S or $R^6$ and $R^8$ are methylene and Y is 1,4-phenylene.

The following examples illustrate the preparation and use of the antioxidant compounds of the present invention.

EXAMPLE 1

Preparation of
N,N'-bis(4-anilinophenyl)-4,10-dithia-7-oxatridecanediamide

To a suspension of 100 grams of N-(4-anilinophenyl) acrylamide in 1200 milliliters of ethanol was added 29 grams of 2-mercaptoethyl ether. A solution of 5 grams of potassium hydroxide in 50 milliliters of ethanol was added at 20°C. Within 5 minutes the temperature began to rise, reaching a maximum of 29°C. after about 15 minutes. As the temperature began to rise, product began to precipitate. The reaction mixture was stirred for 1 hour and the solid product was then filtered off and allowed to dry. There was obtained 123 grams (95 percent of theory) of product which melted at 154°–156° C.

EXAMPLE 2

Preparation of
N,N'-bis(4-anilinophenyl)-4,7,10-trithiatridecanediamide

To a suspension of 200 grams of N-(4-anilinophenyl)acrylamide in 2450 milliliters of ethanol was added 64.8 grams of 2-mercaptoethyl sulfide. A solution of 5 grams of potassium hydroxide in 50 milliliters of ethanol was then added at 20°C. Within 5 minutes the temperature began to rise, reaching a maximum of 31°C. after about 15 minutes. As the temperature began to rise, product began to precipitate. The reaction mixture was stirred for 1 hour and the solid product was then filtered off and allowed to dry. There was obtained 231.7 grams (87.5 percent of theory) of product which melted at 195.5° to 197.5°C.

EXAMPLE 3

Preparation of
N,N'-bis(4-anilinophenyl)-2,12-dimethyl-4,7,10-trithiatridecanediamide Sixty-one grams of 2-mercaptoethyl sulfide was added to a solution of 200 grams of N-(4-anilinophenyl) methacrylamide in 2450 milliliters of ethanol. A solution of 5 grams of potassium hydroxide in 50 milliliters of ethanol was then added, and the mixture was heated at 50°C. for 5 hours. Product began to precipitate after about 2 hours. The mixture was then allowed to cool to room temperature and the solid product was filtered off. The product, after drying, weighed 231.5 grams (89 percent of theory) and melted at 131° to 133.5°C.

EXAMPLE 4

Preparation of
N,N'-bis(4-anilinophenyl)-4,7-dithia-5-methyl-decanediamide

To a suspension of 100 grams of N-(4-anilinophenyl-)acrylamide in one liter of ethanol was added 22.7 grams of 1,2-propanedithiol. A solution of 5grams of potassium hydroxide in 50 milliliters of ethanol was added at 24°C. Within a few minutes the temperature began to rise, reaching a maximum of 34°C. after about 15 minutes. As the temperature began to rise, the acrylamide dissolved and after 1 to 2 minutes product began to precipitate. The reaction mixture was stirred for 2 hours and the solid product was filtered off and allowed to dry. There was obtained 107 grams (87 percent of theory) of product which melted at 147°–150°C.

EXAMPLE 5

Preparation of
N,N'-bis(4-anilinophenyl)-4-thiaheptanediamide

To a suspension of 20.4 grams of N-4(anilinophenyl-)acrylamide in 200 milliliters of ethanol was added 23.3 grams of N-(4-anilinophenyl)-3-mercaptopropionamide. A solution of one gram of potassium hydroxide in 10 milliliters of ethanol was added at 17.5°C. Within a few minutes the temperature began to rise, reaching a maximum of 28°C. Simultaneous with the increase in temperature, product began to precipitate. The reaction mixture was stirred for 2 hours. The solid product was filtered off and allowed to dry. There was obtained 41 grams (94 percent of theory) of product which melted at 199°–203°C.

EXAMPLE 6

Preparation of 1,6-hexamethylene bis
N-(4-anilinophenyl)-4-thiahexanamate

A solution of one gram of potassium hydroxide in 10 milliliters of ethanol was added to a mixture of 38.7 grams of N-(4-anilinophenyl)-2-mercaptoacetamide, 17 grams of 1,6-hexamethylene diacrylate, and 200 milliliters of ethanol. Over a period of 30 minutes the temperature rose from 24° to 33°C. and the product precipitated. The mixture was stirred for an additional 3½ hours and was then filtered. There was obtained 48 grams (86 percent of theory) of product which melted at 108°–112°C.

EXAMPLE 7

Preparation of 4,4'(1,4-phenylene)bis
N-(4-anilinophenyl)-3-thiabutyramide

To a solution of 8.4 grams of potassium hydroxide in 150 milliliters of ethanol was added 38.7 grams of N-(4-anilinophenyl)-2-mercaptoacetamide. There was then added, in small portions, 13 grams of $\alpha,\alpha'$-dichloro-p-xylene. The temperature rose from 28° to 44°C. while the dichloro compound was being added. The reaction mixture was stirred for 3½ hours and was then filtered. The filter cake was washed thoroughly with water and was then dried to yield 37 grams (59 percent of theory) of product which melted at 162°–165°C.

The antioxidants of Examples 1 and 2 were evaluated in SBR-1006, a rubbery butadiene/styrene copolymer, at one part per 100 parts by weight of the SBR polymer, on two separate occasions. Conventional oxygen absorption measurements were made at 100°C. The results are listed below.

Table I

| Sample | Antioxidant | Hours to 1.0% $O_2$ Absorption at 100° C. | |
|---|---|---|---|
| 1 | Example 1 | 204 | 70 |
| 2 | Example 2 | 74 | 379 |
| 3 | Example 3 | — | 555 |

An unstabilized SBR polymer would absorb one percent oxygen at 100°C. in about 2 to 3 hours. As the data above indicate, the antioxidants of Examples 1, 2 and 3 did offer antioxidant protection.

The compounds of Examples 1 and 2 were also evaluated in a sulfur vulcanized, fine particle hydrated silica loaded, rubbery butadiene/acrylonitrile copolymer (NBR) having a bound acrylonitrile content of 32 percent and containing an amine antioxidant. The compounds of Examples 1 and 2 were used at the level of 2.5 parts by weight per 100 parts by weight of the NBR. The same NBR was evaluated without the compounds of Examples 1 and 2. Tensile and elongation measurements were made on all of the vulcanized polymer compositions both before and after aging the vulcanized polymers for 70 hours at 300°F. and for 48 hours at 325°F. Tensile retention and elongation retention values were calculated by multiplying the ratio of the aged tensile (or elongation) to the original tensile (or elongation) by 100. The results are shown in Table II.

Table II

| Sample | Antioxidant | (%)Tensile Retained 70 hrs./ 300° F. | (%)Tensile Retained 48 hrs./ 325° F. | (%)Elongation Retained 70 hrs./ 300° F. | (%)Elongation Retained 48 hrs./ 325° F. |
|---|---|---|---|---|---|
| 4 | None | 54 | 17 | 44 | 23 |
| 5 | Example 1 | 99 | 79 | 94 | 75 |
| 6 | Example 2 | 105 | 86 | 95 | 80 |

As the data indicate, the presence of the compounds of Examples 1 and 2 in the NBR vulcanization resulted in greatly increased tensile retention and elongation retention after aging at high temperatures.

The compounds of Examples 1 and 2 were also compared with a commercial amine antioxidant, 4,4'-bis-(α,α-dimethylbenzyl)diphenylamine, and an amide, N-(4-anilinophenyl)methacrylamide, of the group described in U.S. Pat. No. 3,658,769. The compounds were compared in two types (Types A and B) of silica loaded, sulfur vulcanized NBR both before and after aging the vulcanized polymers for 70 hours at 300°F. The additives were used at the 2.5 part level. The results are shown in Table III.

Table III

| Sample | Antioxidant | Tensile Retained (%) NBR Type A | Tensile Retained (%) NBR Type B | Elongation Retained (%) NBR Type A | Elongation Retained (%) NBR Type B |
|---|---|---|---|---|---|
| 7 | None | 28 | Too Brittle | 17 | Too Brittle |
| 8 | N-(4-anilinophenyl)methacrylamide | 73 | 70 | 62 | 61 |
| 9 | 4,4'bis(α,α-dimethylbenzyl)diphenylamine | 73 | 68 | 65 | 63 |
| 10 | Example 1 | 77 | 72 | 71 | 74 |
| 11 | Example 2 | 79 | 75 | 74 | 78 |

Type A was an NBR of the type evaluated in Table II. Type B had a bound acrylonitrile content of about 28 percent and contained a phenolic antioxidant.

As indicated above, the compounds of Examples 1 and 2 offered effective protection to both types of vulcanized NBR during high temperature aging.

Other antioxidants of the present invention were evaluated at the 2.5 part level in a silica loaded, sulfur vulcanized NBR rubber containing 2,6-di-t-butyl-4-methyl phenol. High temperature aging results are listed below, the aging occurring for 120 hours at 300°F.

Table IV

| Sample | Amide Antioxidant | Tensile Retention (%) | Elongation Retention (%) |
|---|---|---|---|
| 12 | N-(4-anilinophenyl)methacrylamide | 76 | 37 |
| 13 | Example 4 | 89 | 59 |
| 14 | Example 5 | 90 | 57 |
| 15 | Example 6 | 85 | 52 |
| 16 | Example 7 | 82 | 55 |
| 17 | N,N'-bis(4-anilinophenyl)-3-thiahexanediamide | 85 | 54 |
| 18 | 1,6-hexamethylene bis N-(4-anilinophenyl)-heptanamate | 82 | 57 |
| 19[1] | | 0 | 0 |

[1]The only difference between this formulation and the other formulation used with Samples 12 to 18 was that 2.5 parts of an alkyl polyether polysulfide was added.

As the data in Table IV indicate, the compounds of the present invention (Samples 13 to 18) offered effective protection at high temperatures.

Additional compounds were evaluated in a silica loaded, vulcanized NBR (see Type B of Table III), at both the 2.50 parts and 1.25 parts levels, the polymer being aged 120 hours at 300°F.

Table V

| Sample | Antioxidant | 2.5 Parts Tensile Retention (%) | 2.5 Parts Elongation Retention (%) | 1.25 Parts Tensile Retention (%) | 1.25 Parts Elongation Retention (%) |
|---|---|---|---|---|---|
| 20 | N-(4-anilinophenyl)methacrylamide | 18 | 4 | 17 | 4 |
| 21[2] | None | Brittle, no test | | | |
| 22 | N,N'-bis(4-anilinophenyl)-4,9-dithiadodecanediamide | 35 | 13 | 17 | 7 |
| 23 | N,N'-bis(4-anilinophenyl)-2,9-dimethyl-4,7-dithiadecanediamide | 36 | 12 | 21 | 7 |
| 24 | N,N'-bis(4-anilinophenyl)-2,11-dimethyl-4,9-dithiadodecanediamide | 23 | 6 | 19 | 5 |
| 25 | N,N'-bis(4-anilinophenyl)-4,7-dithiadecanediamide | 39 | 17 | 20 | 7 |

[2]The difference between this formulation and the formulation used with Samples 20 and 22 to 25 was that 2.5 parts of an alkyl polyether polysulfide was added instead of one of the compounds of this invention.

Again, compounds of the present invention (Samples 22 to 25) offered improved high temperature protection.

Although vulcanized NBR benefits most by the use of the compounds of the present invention, other polymers, both vulcanized and unvulcanized, are more resistant to oxidation when containing the antioxidants of the present invention than when they contain no antioxidant whatsoever. Substitution of such polymers for NBR in the above working examples and for SBR in the oxygen absorption tests would demonstrate this fact. In addition, the substitution of any of the compounds conforming to structural formula I, including all of those compounds specifically recited herein, for the compounds used in the above working examples would result in polymers with increased resistance to oxidation. Carbon black could also be substituted for the silica in the above working examples and the vulcanized polymer would profit by the use of the antioxidants.

Other compounds conforming to structural formula I which have been prepared and which could be used effectively in the above examples are N,N'-bis(4-anilinophenyl)-3,3'-[3,8-tricyclo(5.2.1.0$^{2,6}$)decanedithio]dipropionamide, N,N'-bis(4-anilinophenyl)-3,3'-(1,5-cyclooctyldithio)dipropionamide and N,N'-bis(4-anilinophenyl)-3,3'-(2,9-menthanedithio)dipropionamide. The latter compound can be produced by the substitution of 2,9-p-menthanedithiol for the 2-mercaptoethyl ether in Example 1.

When R$^6$ is (alkyl) cycloalkylene, preferably R$^{11}$ is ethylene, R$^{10}$ is cyclohexylene and n$^4$ is 0.

It should be noted that the compounds of the present invention need not be symmetrical. That is, A need not be the same as A$^1$. Nor must B have the same structure as A or A$^1$. To illustrate, in the structure for a specific compound the A moiety can have an R$^4$ radical which is hydrogen whereas the A$^1$ moiety can have an R$^4$ radical which is methyl.

While certain representative embodiments and details have been shown for the purpose of illustrating the invention, it will be apparent to those skilled in this art that various changes and modifications may be made therein without departing from the spirit or scope of the invention.

I claim:

1. A compound having the following structural formula:

A—[X]—A$^1$ wherein A and A$^1$ have the following structural formula:

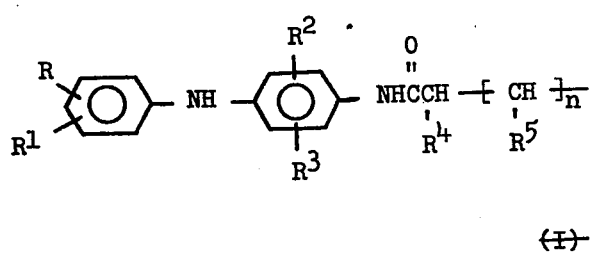

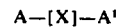

wherein R and R$^1$ are selected from the group consisting of hydrogen, alkyl radicals having 1 to 4 carbon atoms and alkoxy radicals having 1 to 4 carbon atoms; R$^2$ and R$^3$ are selected from the group consisting of hydrogen and alkyl radicals having 1 to 4 carbon atoms; R$^4$ is selected from the group consisting of hydrogen and alkyl radicals having from 1 to 4 carbon atoms; R$^5$ is selected from the group consisting of hydrogen and alkyl radicals having from 1 to 4 carbon atoms; wherein X has the structure

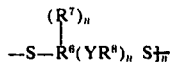

wherein R$^6$ is selected from the group consisting of alkylene radicals having from 1 to 6 carbon atoms, cycloalkylene radicals having from 5 to 12 carbon atoms, and radicals having the structural formula

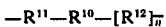

wherein R$^{10}$ is a cycloalkylene radical having from 5 to 12 carbon atoms, R$^{11}$ and R$^{12}$ are alkylene radicals having from 1 to 6 carbon atoms, and n$^4$ is 0 or 1 and wherein R$^7$ is an alkyl radical having from 1 to 4 carbon atoms, R$^8$ is an alkylene radical having from 1 to 6 carbon atoms, Y is selected from the group consisting of

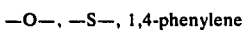

and

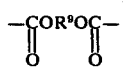

wherein R$^9$ is an alkylene radical having from 2 to 6 carbon atoms which can be unsubstituted or substituted with one or two groups of the structure

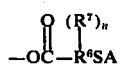

n, n$^2$ and n$^3$ are 0 or 1 and n$^1$ is 0 or 1 to 4.

2. A polymer containing an antioxidant amount of a compound of claim 1.

3. The polymer according to claim 2 wherein R$^1$, R$^2$, R$^3$, R$^4$ and R$^5$ are hydrogen and n$^3$ is 0 or 1; when n$^3$ is 1 and n$^2$ is 0, R$^7$ is hydrogen or methyl and R$^6$ is (alkyl) cycloalkylene or ethylene; and when n$^3$ is 1 and n$^2$ is 1, R$^6$ and R$^8$ are ethylene and Y is S or R$^6$ and R$^8$ are methylene and Y is 1,4-phenylene.

4. The polymer according to claim 2 wherein the compound is selected from the group consisting of N,N'-bis(4-anilinophenyl)-4,7-dithiadecanediamide; N,N'-bis(4-anilinophenyl)-4,7-dithia-5-methyl-decanediamide; N,N'-bis(4-anilinophenyl)-4-thiaheptanediamide and N,N'-bis(4-anilinophenyl)-3,3'-(2,9-p-menthanedithio)dipropionamide.

5. The polymer according to claim 2 wherein the compound is N,N'-bis(4-anilinophenyl)-3,3'-(2,9-p-menthanedithio)dipropionamide.

6. The polymer according to claim 2 wherein the polymer is selected from the group consisting of natural rubber, homopolymers of 1,3-butadiene, isoprene and 2,3-dimethyl butadiene, rubbery copolymers of butadiene and styrene, rubbery copolymers of butadiene and acrylonitrile, polyethylene and polypropylene.

7. The polymer according to claim 2 wherein the polymer is a rubbery copolymer of butadiene and acrylonitrile.

8. The copolymer according to claim 7 wherein the polymer is silica loaded.

* * * * *